(12) United States Patent
Datar et al.

(10) Patent No.: US 9,805,012 B2
(45) Date of Patent: Oct. 31, 2017

(54) ANNOTATION FRAMEWORK FOR VIDEO

(71) Applicant: Google Inc., Mountain View, CA (US)

(72) Inventors: Mayur Datar, Santa Clara, CA (US); Ashutosh Garg, Sunnyvale, CA (US); Vibhu Mittal, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 14/145,641

(22) Filed: Dec. 31, 2013

(65) Prior Publication Data

US 2014/0115440 A1   Apr. 24, 2014

Related U.S. Application Data

(63) Continuation of application No. 13/414,675, filed on Mar. 7, 2012, now Pat. No. 8,775,922, which is a continuation of application No. 12/477,762, filed on Jun. 3, 2009, now Pat. No. 8,151,182, which is a continuation of application No. 11/615,771, filed on Dec. 22, 2006, now Pat. No. 7,559,017.

(51) Int. Cl.
G06F 17/00 (2006.01)
G06F 17/24 (2006.01)
G06F 17/30 (2006.01)
G11B 27/11 (2006.01)

(52) U.S. Cl.
CPC ...... *G06F 17/241* (2013.01); *G06F 17/30817* (2013.01); *G11B 27/11* (2013.01)

(58) Field of Classification Search
CPC .................................................... G06F 17/241
See application file for complete search history.

(56) References Cited

U.S. PATENT DOCUMENTS

| | | | |
|---|---|---|---|
| 5,339,393 A | 8/1994 | Duffy et al. | |
| 5,388,197 A | 2/1995 | Rayner | |
| 5,414,806 A | 5/1995 | Richards | |
| 5,465,353 A * | 11/1995 | Hull ................. | G06F 17/30253 |
| 5,530,861 A * | 6/1996 | Diamant ............ | G06F 9/45512 |
| | | | 705/7.21 |
| 5,600,775 A | 2/1997 | King et al. | |

(Continued)

FOREIGN PATENT DOCUMENTS

CN      1332556 A      1/2002
JP    2003-283981     10/2003

(Continued)

OTHER PUBLICATIONS

4$^{th}$ Office Action for Chinese Patent Application No. CN 200780050525.4, dated Oct. 26, 2015, 6 Pages.

(Continued)

*Primary Examiner* — Laurie Ries
(74) *Attorney, Agent, or Firm* — Byrne Poh LLP

(57) ABSTRACT

A system and method for transferring annotations associated with a media file. An annotation associated with a media file is indexed to a first instance of that media file. By comparing features of the two instances, a mapping is created between the first instance of the media file and a second instance of the media file. The annotation can be indexed to the second instance using the mapping between the first and second instances. The annotation can be processed (displayed, stored, or modified) based on the index to the second instance.

20 Claims, 10 Drawing Sheets

(56) References Cited

U.S. PATENT DOCUMENTS

| | | | |
|---|---|---|---|
| 5,664,216 A | 9/1997 | Blumenau | |
| 5,708,845 A | 1/1998 | Wistendahl et al. | |
| 5,732,184 A | 3/1998 | Chao et al. | |
| 5,812,642 A | 9/1998 | Leroy | |
| 5,966,121 A | 10/1999 | Hubbell et al. | |
| 6,006,241 A * | 12/1999 | Purnaveja | H04N 5/04 715/205 |
| 6,144,375 A | 11/2000 | Jain | |
| 6,295,092 B1 | 9/2001 | Hullinger et al. | |
| 6,415,438 B1 | 7/2002 | Blackketter et al. | |
| 6,570,587 B1 | 5/2003 | Efrat et al. | |
| 6,774,908 B2 | 8/2004 | Bates et al. | |
| 6,956,573 B1 * | 10/2005 | Bergen | G06F 17/30802 345/473 |
| 6,956,593 B1 * | 10/2005 | Gupta | G06F 17/22 707/E17.009 |
| 6,993,347 B2 | 1/2006 | Bodin et al. | |
| 7,032,178 B1 | 4/2006 | McKnight et al. | |
| 7,055,168 B1 * | 5/2006 | Errico | G06F 17/30029 348/E7.061 |
| 7,080,139 B1 * | 7/2006 | Briggs | G06Q 30/02 707/999.003 |
| 7,131,059 B2 | 10/2006 | Obrador | |
| 7,137,062 B2 | 11/2006 | Kaufman et al. | |
| 7,149,755 B2 | 12/2006 | Obrador | |
| 7,243,301 B2 | 7/2007 | Bargeron et al. | |
| 7,254,605 B1 | 8/2007 | Strum | |
| 7,383,497 B2 | 6/2008 | Glenner et al. | |
| 7,418,656 B1 | 8/2008 | Petersen | |
| 7,559,017 B2 | 7/2009 | Datar et al. | |
| 7,599,950 B2 | 10/2009 | Walther et al. | |
| 7,616,946 B2 | 11/2009 | Park et al. | |
| 7,636,883 B2 * | 12/2009 | Albornoz | G06F 17/2247 715/231 |
| 7,644,364 B2 * | 1/2010 | Patten | G11B 27/034 715/723 |
| 7,724,277 B2 | 5/2010 | Shingu et al. | |
| 7,761,436 B2 | 7/2010 | Norton et al. | |
| 7,945,653 B2 | 5/2011 | Zuckerberg et al. | |
| 8,151,182 B2 | 4/2012 | Datar et al. | |
| 8,181,201 B2 | 5/2012 | Goldenberg et al. | |
| 8,202,167 B2 | 6/2012 | Ackley et al. | |
| 8,209,223 B2 | 6/2012 | Fink et al. | |
| 8,280,827 B2 | 10/2012 | Muller et al. | |
| 8,392,834 B2 | 3/2013 | Obrador | |
| 8,713,618 B1 | 4/2014 | Kuznetsov | |
| 8,839,327 B2 | 9/2014 | Amento et al. | |
| 2001/0023436 A1 * | 9/2001 | Srinivasan | G11B 27/031 709/219 |
| 2002/0049983 A1 * | 4/2002 | Bove, Jr. | G06F 17/30855 725/135 |
| 2002/0059218 A1 | 5/2002 | August et al. | |
| 2002/0059342 A1 * | 5/2002 | Gupta | G06F 17/241 715/233 |
| 2002/0059584 A1 * | 5/2002 | Ferman | G06F 17/30017 725/34 |
| 2002/0065678 A1 | 5/2002 | Peliotis et al. | |
| 2002/0069218 A1 | 6/2002 | Sull et al. | |
| 2002/0078092 A1 | 6/2002 | Kim et al. | |
| 2002/0078446 A1 * | 6/2002 | Dakss | G06F 17/30855 725/37 |
| 2002/0120925 A1 | 8/2002 | Logan | |
| 2002/0188630 A1 | 12/2002 | Davis et al. | |
| 2003/0002851 A1 | 1/2003 | Hsiao et al. | |
| 2003/0018668 A1 | 1/2003 | Britton et al. | |
| 2003/0020743 A1 * | 1/2003 | Barbieri | G06F 17/30802 715/719 |
| 2003/0039469 A1 | 2/2003 | Kim | |
| 2003/0068046 A1 | 4/2003 | Lindqvist et al. | |
| 2003/0093790 A1 | 5/2003 | Logan et al. | |
| 2003/0095720 A1 * | 5/2003 | Chiu | H04N 5/262 382/284 |
| 2003/0107592 A1 | 6/2003 | Li et al. | |
| 2003/0112276 A1 * | 6/2003 | Lau | G06F 17/30017 715/764 |
| 2003/0177503 A1 * | 9/2003 | Sull | G06F 17/30796 725/112 |
| 2003/0196164 A1 | 10/2003 | Gupta et al. | |
| 2003/0196964 A1 * | 10/2003 | Koslow | A01N 25/26 210/681 |
| 2003/0231198 A1 | 12/2003 | Janevski | |
| 2004/0021685 A1 | 2/2004 | Denoue et al. | |
| 2004/0125133 A1 * | 7/2004 | Pea | G06F 17/30014 715/751 |
| 2004/0125148 A1 * | 7/2004 | Pea | H04N 5/262 715/802 |
| 2004/0128308 A1 * | 7/2004 | Obrador | G06F 17/30056 |
| 2004/0138946 A1 | 7/2004 | Stolze | |
| 2004/0168118 A1 * | 8/2004 | Wong | G06F 17/30017 715/202 |
| 2004/0172593 A1 | 9/2004 | Wong et al. | |
| 2004/0181545 A1 * | 9/2004 | Deng | G11B 27/30 |
| 2004/0205482 A1 | 10/2004 | Basu et al. | |
| 2004/0205547 A1 * | 10/2004 | Feldt | G06F 17/241 715/201 |
| 2004/0210602 A1 * | 10/2004 | Hillis | G06F 17/3089 |
| 2005/0044254 A1 | 2/2005 | Smith | |
| 2005/0081159 A1 | 4/2005 | Gupta et al. | |
| 2005/0132401 A1 | 6/2005 | Boccon-Gibod et al. | |
| 2005/0160113 A1 | 7/2005 | Sipusic et al. | |
| 2005/0203876 A1 | 9/2005 | Cragun et al. | |
| 2005/0203892 A1 * | 9/2005 | Wesley | H04L 67/2838 |
| 2005/0207622 A1 * | 9/2005 | Haupt | G06K 9/00288 382/118 |
| 2005/0216457 A1 | 9/2005 | Walther et al. | |
| 2005/0275716 A1 * | 12/2005 | Shingu | G06F 17/30056 348/14.13 |
| 2005/0289142 A1 * | 12/2005 | Adams, Jr. | G06F 17/30064 |
| 2005/0289469 A1 | 12/2005 | Chandler et al. | |
| 2006/0041564 A1 | 2/2006 | Jain et al. | |
| 2006/0053365 A1 | 3/2006 | Hollander et al. | |
| 2006/0059120 A1 * | 3/2006 | Xiong | G06F 17/30787 |
| 2006/0064733 A1 | 3/2006 | Norton et al. | |
| 2006/0087987 A1 * | 4/2006 | Witt | G06F 17/30017 370/260 |
| 2006/0101328 A1 | 5/2006 | Albornoz et al. | |
| 2006/0161578 A1 | 7/2006 | Siegel et al. | |
| 2006/0161838 A1 | 7/2006 | Nydam et al. | |
| 2006/0218590 A1 * | 9/2006 | White | H04N 5/44543 725/46 |
| 2006/0286536 A1 | 12/2006 | Mohler et al. | |
| 2006/0294134 A1 | 12/2006 | Berkhim et al. | |
| 2007/0002946 A1 | 1/2007 | Bouton et al. | |
| 2007/0038610 A1 | 2/2007 | Omoigui | |
| 2007/0099684 A1 | 5/2007 | Butterworth | |
| 2007/0101387 A1 * | 5/2007 | Hua | G06F 17/30793 725/113 |
| 2007/0121144 A1 * | 5/2007 | Kato | G06F 3/1204 358/1.14 |
| 2007/0162568 A1 | 7/2007 | Gupta et al. | |
| 2007/0174774 A1 * | 7/2007 | Lerman | G06F 17/30017 715/723 |
| 2007/0250901 A1 | 10/2007 | McIntire et al. | |
| 2007/0256016 A1 | 11/2007 | Bedingfield | |
| 2007/0266304 A1 * | 11/2007 | Fletcher | G06F 17/241 715/230 |
| 2007/0271331 A1 | 11/2007 | Muth | |
| 2008/0005064 A1 | 1/2008 | Sarukkai | |
| 2008/0028294 A1 | 1/2008 | Sell et al. | |
| 2008/0028323 A1 | 1/2008 | Rosen et al. | |
| 2008/0086742 A1 | 4/2008 | Aldrey et al. | |
| 2008/0091723 A1 | 4/2008 | Zuckerberg et al. | |
| 2008/0092168 A1 | 4/2008 | Logan et al. | |
| 2008/0109841 A1 * | 5/2008 | Heather | G06Q 30/02 725/32 |
| 2008/0168055 A1 | 7/2008 | Rinearson et al. | |
| 2008/0168070 A1 | 7/2008 | Naphade et al. | |
| 2008/0168073 A1 | 7/2008 | Siegel et al. | |
| 2008/0195657 A1 * | 8/2008 | Naaman | G06K 9/00677 |
| 2008/0250331 A1 | 10/2008 | Tulshibagwale | |
| 2009/0007200 A1 | 1/2009 | Amento et al. | |

(56) References Cited

U.S. PATENT DOCUMENTS

| | | |
|---|---|---|
| 2009/0076843 A1 | 3/2009 | Graff |
| 2009/0087161 A1 | 4/2009 | Roberts et al. |
| 2009/0094520 A1 | 4/2009 | Kulas |
| 2009/0150947 A1 | 6/2009 | Soderstrom |
| 2009/0172745 A1* | 7/2009 | Horozov ............... H04H 60/37 725/61 |
| 2009/0199251 A1 | 8/2009 | Badoiu et al. |
| 2009/0204882 A1 | 8/2009 | Hollander et al. |
| 2009/0210779 A1 | 8/2009 | Badoiu et al. |
| 2009/0249185 A1 | 10/2009 | Datar et al. |
| 2009/0276805 A1 | 11/2009 | Andrews et al. |
| 2009/0297118 A1 | 12/2009 | Fink et al. |
| 2009/0300475 A1 | 12/2009 | Fink et al. |
| 2010/0169927 A1 | 7/2010 | Yamaoka et al. |
| 2010/0287236 A1 | 11/2010 | Amento et al. |
| 2013/0238995 A1 | 9/2013 | Polack |
| 2013/0263002 A1 | 10/2013 | Park |
| 2013/0290996 A1 | 10/2013 | Davis |
| 2014/0101691 A1 | 4/2014 | Sinha et al. |

FOREIGN PATENT DOCUMENTS

| | | |
|---|---|---|
| JP | 2004-080769 | 3/2004 |
| JP | 2004-193979 A | 7/2004 |
| JP | 2005-530296 | 10/2005 |
| JP | 2006-157689 | 6/2006 |
| JP | 2006-157692 | 6/2006 |
| JP | 2006155384 A | 6/2006 |
| JP | 2007-142750 | 6/2007 |
| JP | 2007-151057 | 6/2007 |
| JP | 2007-274090 | 10/2007 |
| JP | 2007/529822 | 10/2007 |
| JP | 2007-310833 | 11/2007 |
| JP | 2007/317123 | 12/2007 |
| KR | 10-2004-0041082 A | 5/2004 |
| KR | 2007-0004153 A1 | 1/2007 |
| WO | WO 03/019418 A1 | 3/2003 |
| WO | WO 2007/082169 A2 | 7/2007 |
| WO | WO 2007/135688 A2 | 11/2007 |

OTHER PUBLICATIONS

2nd Office Action for CN Application No. 200780050525.4, dated Sep. 16, 2014, 21 pages.

Summons to attend oral proceedings pursuant to Rule 115(1) EPC for EP Application No. 09709327.2, dated Sep. 25, 2014, 9 pages.

Office Action for KR Application No. 10-2010-7020965, dated Feb. 26, 2015, 11 pages, (with concise statement).

3rd Office Action for Chinese Patent Application No. CN 200780050525.4, dated Apr. 30, 2015, 8 Pages.

Communication pursuant to Article 94(3) EPC for European Patent Application No. EP07865849.9, dated Apr. 28, 2015, 6 pages.

Extended European Search Report for European Patent Application No. EP09758919.6, dated Feb. 10, 2015, 7 Pages.

Japanese Office Action for JP Application No. P2014-094684, dated Mar. 17, 2015, 9 Pages.

Arman, F., et al., "Image Processing on Encoded Video Sequences", ACM Multimedia Systems Journal, pp. 211-219, vol. 1, No. 5, 1994.

Ford, R., et al., *Metrics for shot boundary detection in digital video sequences*, Multimedia Systems, Jan. 2000, pp. 37-46, vol. 8.

Gonzalez, N., "Video Ads: Every Startup Has a Different Solution," TechCrunch, Jul. 6, 2007, 7 Pages, [online] [Retrieved on Apr. 20, 2009] Retrieved from the internet <URL:http://www.techcrunch.com/2007/07/06/video-ads-somebody-needs-to-solve-this-problem/>.

Good, R., "Online Video Publishing Gets Into the Conversation: Click.TV," Robin Good, What Communication Experts Need to Know, Apr. 18, 2006, 10 pages, [online] [retrieved on Jan. 16, 2007] Retrieved from the Internet: <URL: http://www.masternewmedia.org/news/2006/04/18/online_video_publishing_gets_into.html>.

Mikolajczyk, K. et al., "A Performance Evaluation of Local Descriptors", IEEE Transactions on Pattern Analysis and Machine Intelligence, Oct. 2005, vol. 27, No. 10, pp. 1615-1630, 16 pages.

Moenne-Loccoz, N., et al., "Managing Video Collections at Large," CUDB '04: Proceedings of the 1st International Workshop on Computer Vision Meets Database, Jun. 2004, pp. 59-66.

Naphade, M.R., et al., "A High Performance Shot Boundary Detection Algorithm using Multiple Cues", 1998 International Conference on Image Processing, pp. 884-887, Oct. 4-7, 1988, Chicago, IL, USA.

Tjondronegoro, D., et al., "Content-Based Video Indexing for Sports Applications Using Integrated Multi-Modal Approach," Multimedia '05: Proceedings of the 13th Annual ACM International Conference on Multimedia, Nov. 2005, p. 1035-1036.

Zabih, R., et al., "A Feature-Based Algorithm for Detecting and Classifying Scene Breaks", Proc. ACM Multimedia 95, pp. 189-200, Nov. 1993, San Francisco, CA.

Zentation.com [online] [Retrieved on Jun. 26, 2009] Retrieved from the internet <URL:http://www.zentation.com/>.

Zentation.com [online] [Retrieved on Jun. 26, 2009] Retrieved from the internet <URL:http://www.zentation.com/viewer/index.phppasscode=epbcSNExIQr>.

Zentation.com [online] [Retrieved on Jun. 26, 2009] Retrieved from the internet <URL:http://www.zentation.com/viewer/setup.php?passcode=De2cwpjHsd>.

"New Feature: Link within a Video," Google Video Blog, Jul. 19, 2006, [online] [Retrieved on Jul. 18, 2008] Retrieved from the internet <URL:http://googlevideo.blogspot.com/2006/07/new-feature-link-within-video_19.html>.

"New commenting and stats features," Google Video Blog, Nov. 14, 2006, [online] [Retrieved on Jul. 18, 2008] Retrieved from the internet <URL:http://googlevideo.blogspot.com/2006/11/new-commenting-and-stats-features.html>.

"Online Media Bookmark Manager," Media X, Date Unknown, [online] [Retrieved on Jul. 18, 2008] Retrieved from the internet <URL:http://mediax.stanford.edu/documents/bookmark.pdf>.

"Ticket #3504 (new enhancement)," Participatory Culture Foundation, Software Development, Aug. 14, 2006, 1 page, [online] [retrieved on Jan. 16, 2007] Retrieved from the Internet: <URL: https://develop.participatoryculture.org/trac/democracy/ticket/3504>.

"Video Marketing, Video Editing & Hosting, Interactive Video," Veeple.com, 2009, 1 page, [online] [Retrieved on Apr. 20, 2009] Retrieved from the internet <URL:http://www.veeple.com/interactivity.php>.

"More on Mojiti," bavatuesdays.com, Mar. 23, 2007, 4 pages, [online] [Retrieved on Apr. 20, 2009] Retrieved from the internet <URL:http://bavatuesdays.com/more-on-mojiti/>.

"BubblePLY," PLYmedia Inc. 2008, 1 page, [online] [Retrieved on Apr. 20, 2009] Retrieved from the internet URL:http://www.plymedia.com/products/bubbleply/bubbleply.aspx>.

"Ooyala—Interactive Video Advertising," Ooyala, Inc. 2009, 1 page, [online] [Retrieved on Apr. 20, 2009] Retrieved from the internet <URL:http://www.ooyala.com/products/ivideo>.

MirriAd, 2008, 1 page, [online] [Retrieved on Apr. 20, 2009] Retrieved from the internet <URL:http://www.mirriad.com>.

Screenshot of "Remixer", YouTube.com, May 2007 to Feb. 2008, 1 page.

Screenshot of Veeple Labs—Interactive Video, [online] [Retrieved on Jun. 9, 2008] Retrieved from the internet <URL:http://www.veeple.com/>.

Screenshot of "Interactive Video Demo—Check out the Yelp / AdSense demo," Ooyala, Inc. 2009, [online] [Retrieved on Apr. 23, 2009] Can be retrieved from the internet <URL:http://www.ooyala.com/products/ivideo>.

Caspi, Y., et al. "Sharing Video Annotations," International Conference on Image Processing, 2004, pp. 2227-2230.

Gordon, A., "Using Annotated Video as an Information Retrieval Interface," IUI ACM, 2000, pp. 133-140.

Miyamori H., et al: "Generation of views of TV content using TV viewers perspectives expressed in live chats on the web", Proceedings of the 13th ACM International Conference on Multimedia, Nov. 6, 2015 (Nov. 6, 2005), p. 853.

(56) References Cited

OTHER PUBLICATIONS

Korean Intellectual Property Office Notice of Preliminary Rejection, Korean Patent Application No. 10-2009-7015068, dated Feb. 5, 2010, 12 pages.
Korean Intellectual Property Office Notice of Preliminary Rejection, Korean Patent Application No. 10-2009-7015068, dated Oct. 5, 2009, 4 pages.
PCT International Search Report and Written Opinion, PCT/US2009/034422, dated Oct. 6, 2009, 12 Pages.
PCT International Search Report and Written Opinion, PCT/US2007/088067, dated Jul. 21, 2008, 13 pages.
PCT International Search Report and Written Opinion, PCT/US2009/042919, dated Jun. 17, 2009, 8 pages.
PCT International Search Report and Written Opinion, PCT/US2009/033475, dated Aug. 20, 2009, 7 Pages.
Notice of Grounds for Rejection, Japan Patent Application No. P2009-543172, dated Oct. 19, 2010, 7 Pages.
Office Action for Japanese Patent Application No. P2010-546967, dated Apr. 23, 2013, 5 Pages.
First Office Action for Chinese Patent Application No. 200780050525.4, dated Dec. 21, 2010, 20 Pages.
Notification of Second Board Opinion for Chinese Patent Application No. CN 200780050525.4, dated Dec. 26, 2013, 5 Pages.
Notification of Reexamination Board Opinion for Chinese Patent Application No. 200780050525.4, dated Jun. 14, 2013, 11 Pages.
Chinese First Office Action, Chinese Application No. 200910206036.4, dated Sep. 18, 2012, 19 pages.
Chinese Second Office Action, Chinese Application No. 200980108230.7, dated Aug. 13, 2012, 11 pages.
Examiner's first report on Australian Patent Application No. AU 2010249316, dated Jun. 20, 2011, 3 Pages.
Examiner's Report No. 2 on Australian Patent Application No. AU 2010249316, dated Jan. 27, 2012, 3 Pages.
Office Action for Canadian Patent Application No. CA-2,672,757, dated Mar. 21, 2013, 5 Pages.
Office Action for Canadian Patent Application No. CA-2,726,777, dated Nov. 26, 2012, 3 Pages.
European Extended Search Report, European Application No. 09709327.2, dated Sep. 21, 2012, 7 pages.
Supplementary European Search Report for European Patent Application No. EP 07865849.9, dated May 18, 2012, 7 Pages.
Supplementary European Search Report for European Patent Application No. EP 09711777, dated Dec. 19, 2012, 16 Pages.
Communication Pursuant to Article 94(3) EPC for European Patent Application No. EP 09709327.2, dated Jan. 10, 2014, 6 Pages.
Office Action for U.S. Appl. No. 12/477,762, dated Jun. 16, 2011, 14 Pages.
Office Action for U.S. Appl. No. 11/615,771, dated Dec. 29, 2008, 20 Pages.
Office Action for U.S. Appl. No. 11/615,771, dated Jul. 22, 2008, 22 Pages.
Schroeter, R., et al., "Vannotea—A Collaborative Video Indexing, Annotation and Discussion System for Broadband Networks," Knowledge Capture, 2006, pp. 1-8.
First Examination Report for Indian Patent Application No. 1191/MUMNP/2009, dated Mar. 18, 2014, 2 Pages.
Patent Examination Report No. 1 for Australian Patent Application No. AU 2012244141, dated Apr. 29, 2014, 3 Pages.
Communication pursuant to Article 91(3) EPC for European Patent Application No. 09711777.4, dated Aug. 18, 2015, 8 Pages.
Decision of Rejection for Japanese Patent Application No. JP 2014-094684, dated Feb. 1, 2016, 7 Pages.
Summons to attend oral proceedings pursuant to Rule 115(1) EPC for European Patent Application No. EP 07865849.9, dated Apr. 13, 2016, 6 Pages.
Office Action for Canadian Patent Application No. CA 2,866,548, dated Apr. 21, 2016, 3 Pages.
May, M., "Computer Vision: What is the difference between local descriptors and global descriptors," Computer Vision, Mar. 31, 2013, 1 Page, Can be retrieved at <URL:https://www.quora.com/Computer-Vision-What-is-the-difference-between-local-descriptors-and-global-descriptors>.
Summons to attend oral proceedings pursuant to Rule 115(1) EPC for European Patent Application No. EP 09711777.4, dated Apr. 24, 2017, 12 Pages.
Masuda, T., et al., "Video Scene Retrieval Using Online Video Annotation," New Frontiers in Artificial Intelligent, Lecture Notes in Computer Science, Jun. 23, 2003, pp. 54-62.

* cited by examiner

ANNOTATION FRAMEWORK FOR VIDEO

CROSS-REFERENCE TO RELATED APPLICATION

This application is a continuation of U.S. application Ser. No. 13/414,675, filed Mar. 7, 2012, which is a continuation of U.S. application Ser. No. 12/477,762, filed Jun. 3, 2009, which is a continuation of U.S. application Ser. No. 11/615,771, filed Dec. 22, 2006. Each of these applications is incorporated by reference herein in its entirety.

TECHNICAL FIELD

The disclosed embodiments relate generally to the authoring and display of annotations for video, and to the collaborative sharing and editing of annotations over a network.

BACKGROUND

Annotations provide a mechanism for supplementing video with useful information Annotations can contain, for example, metadata describing the content of the video, subtitles, or additional audio tracks. Annotations can be of various data types, including text, audio, graphics, or other forms. To make their content meaningful, annotations are typically associated with a particular video, or with a particular portion of a video.

One method by which the useful information contained in annotations can be exchanged is by transferring annotated video over a network. However, transferring video content over a network introduces several obstacles. First, video files are generally quite large, and transferring video requires substantial amounts of bandwidth, as well as host and recipient computers that can support the required bandwidth and storage needs. Second, many video files are likely to be copyrighted, or to be otherwise prohibited from distribution without payment of a fee. Compliance with copyright restrictions requires additional software and hardware investments to prevent unauthorized copying. Third, as the recipient of an annotated video may already have an unannotated copy of the video, from a data efficiency perspective the transfer of an annotated copy of the video to such a recipient unnecessarily consumes both bandwidth and storage.

Thus, exchanging annotated video by transferring a complete copy of the video is an inadequate solution.

SUMMARY

Annotations associated with a media file are transferred between devices independently of the associated media file, while maintaining the appropriate temporal or spatial relationship of the annotation with any segment of the media file. An annotation associated with a media file is indexed to a first instance of that media file. A mapping is created between the first instance of the media file and a second instance of the media file by comparing features of the two instances. The annotation can be indexed to the second instance using the mapping between the first and second instances. The annotation can be displayed, stored, or modified based on the index to the second instance.

Comparing features of instances allows the annotations to be consistently indexed to a plurality of independently acquired instances of a media file. Consistent indexing of annotations supports sharing of annotations and allows for a collaborative community of annotation authors, editors, and consumers. Annotations can include advertisements or premium for-pay content. Privileges for submitting, editing or viewing annotations can be offered for sale on a subscription basis, free of charge, or can be bundled with purchase of media files.

According to one embodiment, a first user submits to an annotation server annotations that are indexed to his instance of a media file. The annotation server maps the first user's instance of the media file to a canonical instance of the media file and stores the submitted annotation indexed to the canonical instance of the media file. A second user requests annotations, and the annotation server maps the second user's instance of the media file to the canonical instance of the media file. The annotation server sends the annotation to the second user indexed to the second user's instance of the media file.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

Figure 1:
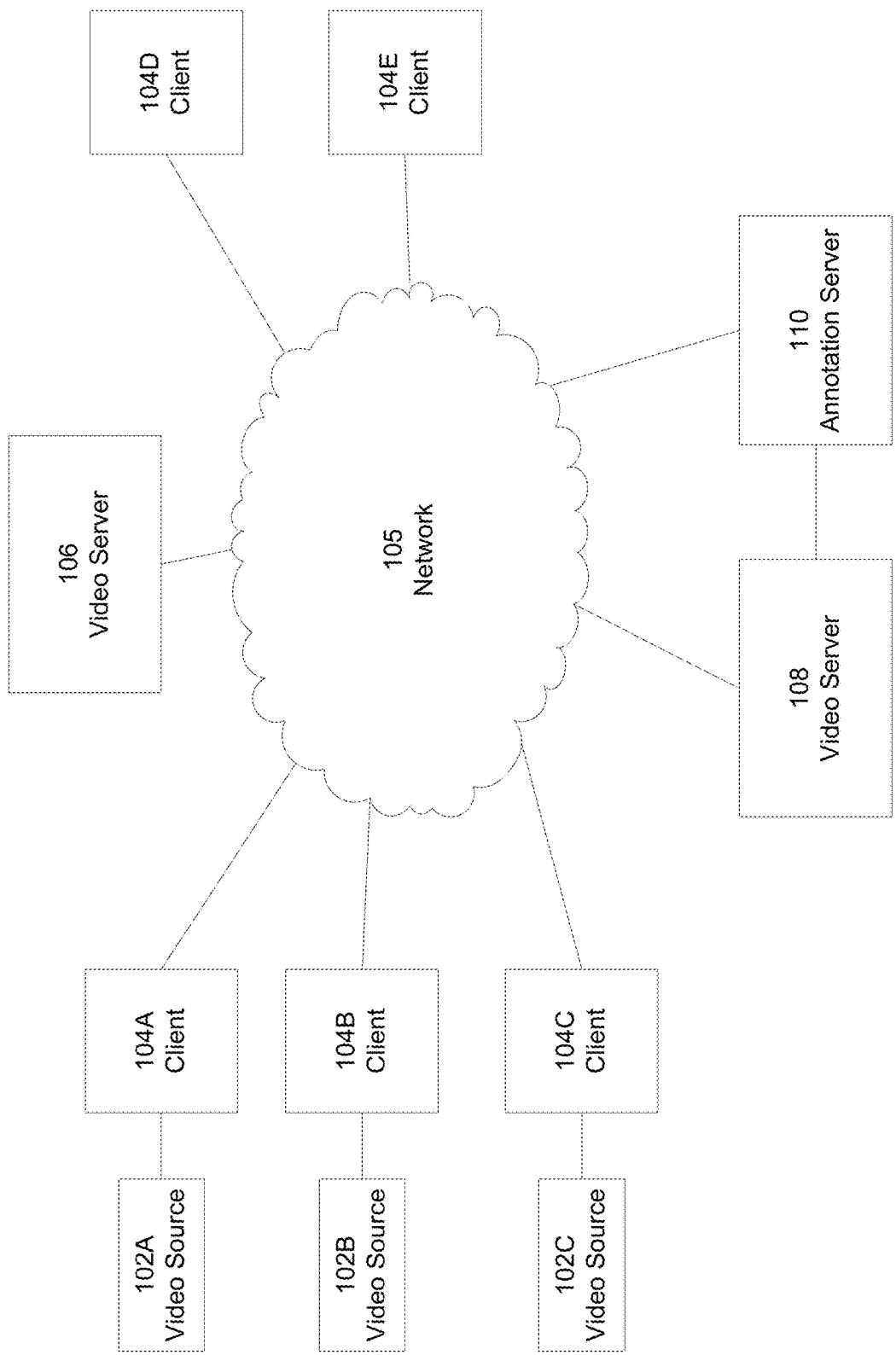
FIG. 1 shows a network connecting a community of video providers and consumers.

FIG. 1 shows a network connecting a community of video providers and consumers. FIG. 1 illustrates one embodiment by which a plurality of users can exchange videos and annotations. Video is used herein as an example of a media file with which annotation can be associated. This example is chosen for the purposes of illustration and is not limiting. Other types of media files with which annotations can be associated include, but are not limited to, audio programs, Flash, movies (in any encoding format), slide presentations, photo collections, animated programs, and other documents. Other examples will be apparent to one of skill in the art without departing from the scope of the present invention.

Figure 7A:
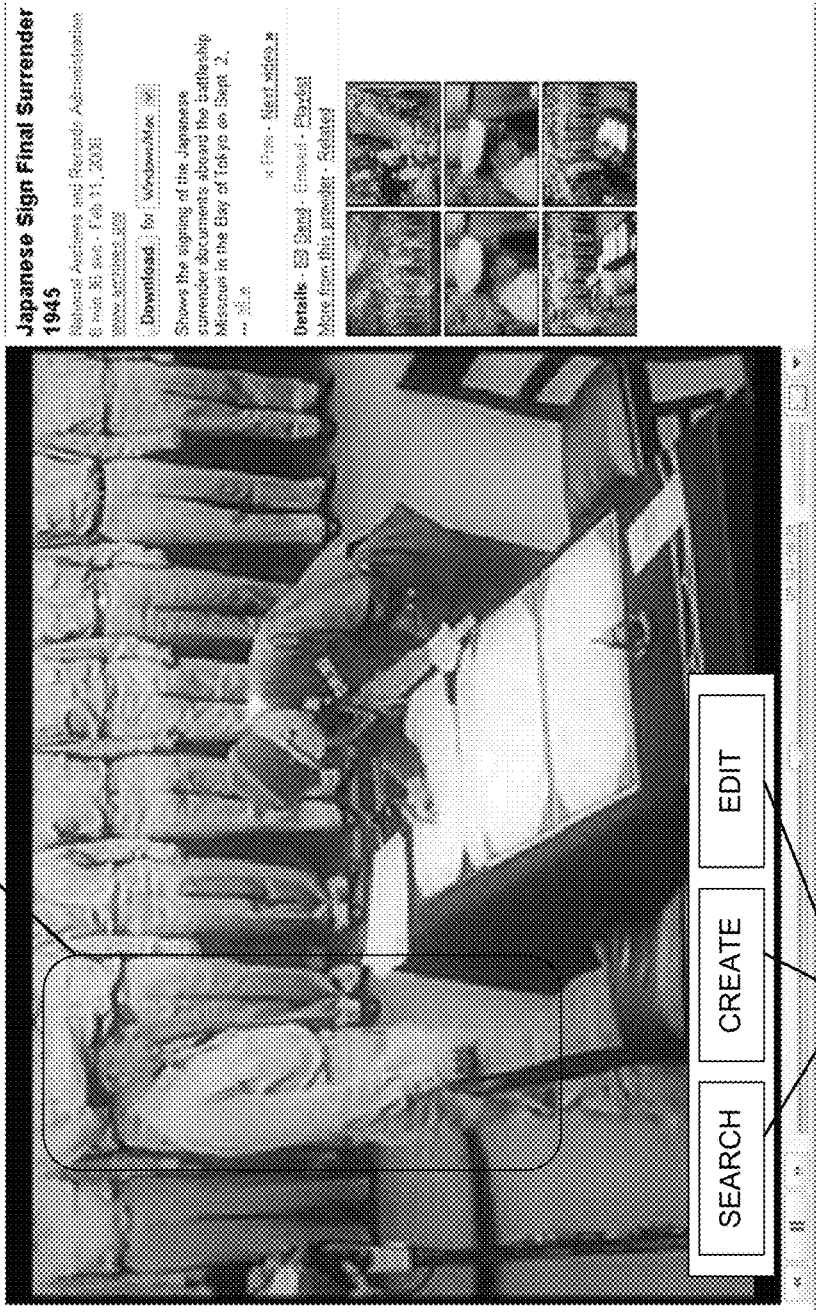
FIG. 7(a) illustrates a user interface for viewing, creating, and editing annotations.

A user views, authors, and edits annotations using a client 104. An annotation is any data which can usefully supplement a media file. For example, an annotation can be an audio or textual commentary, translation, advertisement or summary, rating on a predetermined scale (1-5 stars), metadata, or a command for how the media file should be displayed. An annotation can also include video content. The clients 104 include software and hardware for displaying video. For example, a client 104 can be implemented as a television, a personal computer, a digital video recorder (DVR), a personal digital assistant (PDA), a cellular telephone, or another device having or connected to a display device; software includes any video player adapted to decode video files, such as MPEG-2, MPEG-4, QuickTime, VCD, or any other current or future video format. Other examples of clients will be apparent to one of skill in the art without departing from the scope of the present invention. A graphical user interface used by the client 104 according to one embodiment is described herein with references to FIGS. 7(a) and 7(b).

The clients 104 are connected to a network 105. The network 105 can be implemented as any electronic medium by which annotation content can be transferred. Through the network 105, the clients 104 can send and receive data from other clients 104. The network 105 can be a global (e.g., the Internet), regional, wide-area, or local area network.

A video server 106 stores a collection of videos on an electronic medium. Responsive to a request by a client 104 for a particular video (or a set of videos matching certain criteria), the video server 106 transfers a video over the network 105 to the client 104. The video server 106 may be configured to charge a fee for the service of providing the video to the client, or it may provide the video free of charge. The video server 106 can be implemented, for example, as an on-demand content service, an online store, or a streaming video server. Other examples of video servers will be apparent to one of skill in the art without departing from the scope of the present invention.

Some of the clients 104 are also connected to video sources 102. A video source 102 is a device providing video to the client. For example, a video source 102 could be a cable box, a television antenna, a digital video recorder, a video cassette player, a camera, a game console, a digital video disk (DVD) unit, or any other device capable of producing a video output in a format readable by the client 104. Other examples of video sources 102 will be apparent to one of skill in the art without departing from the scope of the present invention.

According to one embodiment of the present invention, clients 104 can send video over the network 105. For example, the client 104B can receive video from the video source 102B and transfer it through the network to another client, such as the client 104D. Clients 104 can also send video through the network 105 to the video server 106. Video sent from a client 104 to the video server 106 is stored on an electronic medium and is available to other clients 104.

Annotation server 110 is connected to the network 105. The annotation server 110 stores annotations on an electronic medium. Responsive to a request from a client 104 for an annotation associated with a particular media file, the annotation server 110 sends one or more annotations associated with the media file to the client 104 through the network 105. Responsive to a submission by the client 104 of one or more annotations associated with a media file, the annotation server 110 stores the one or more annotations in association with the media file. The annotation server 110 stores annotations indexed to instances of one or more media files or portions thereof. A method used by the annotation server 110, according to various embodiments of the present invention, is described herein with reference to FIGS. 4-6.

Optionally, a video server 108 is communicatively connected to the annotation server 110, either locally or over the network 105. The video server 108 can have many of the same capabilities as described herein with reference to the video server 106. The video server 108 can transfer video to the clients 104 over the network 105. In one embodiment, the annotation server 110 and video server 108 in combination transfer annotated video to a client 104. In another embodiment, the video server 108 stores a canonical instance of a video, as described herein with reference to FIG. 5.

As shown in the figure, any given client may have access to video from a variety of sources. For example, the client 104A can receive video directly from the video source 102A or from the video server 106 via the network 105. Different clients sometimes have access to different video sources. For example, like the client 104A, the client 104B can receive video from the video server 106 via the network 105, but, in contrast to the client 104A, has direct access to the video source 102B instead of the video source 102A.

Although a client can obtain video from a potentially wide range of video sources, the present invention allows annotations sent from the annotation server 110 to the client to be consistently associated with a particular media file and portion thereof, regardless of the source from which the client's copy of the video was obtained. The consistent association of annotations with media files facilitates the exchange of annotations between users having different instances (or copies) of a given media file. The present invention enables the sharing and exchange of annotations among a plurality of clients by reindexing annotations for various instances of client media files. For example, the annotation server 110 sends annotations indexed to the client 104A's instance of a video and sends annotations indexed to the client 104B's instance of the video, despite the fact that the two clients may have acquired their copies of the video from different sources. The annotation server 110 beneficially provides annotations that are not only appropriate for the video displayed by the client 104, but for the particular instance of the video which the client 104 is displaying, as described herein with reference to FIG. 4.

Figure 2:
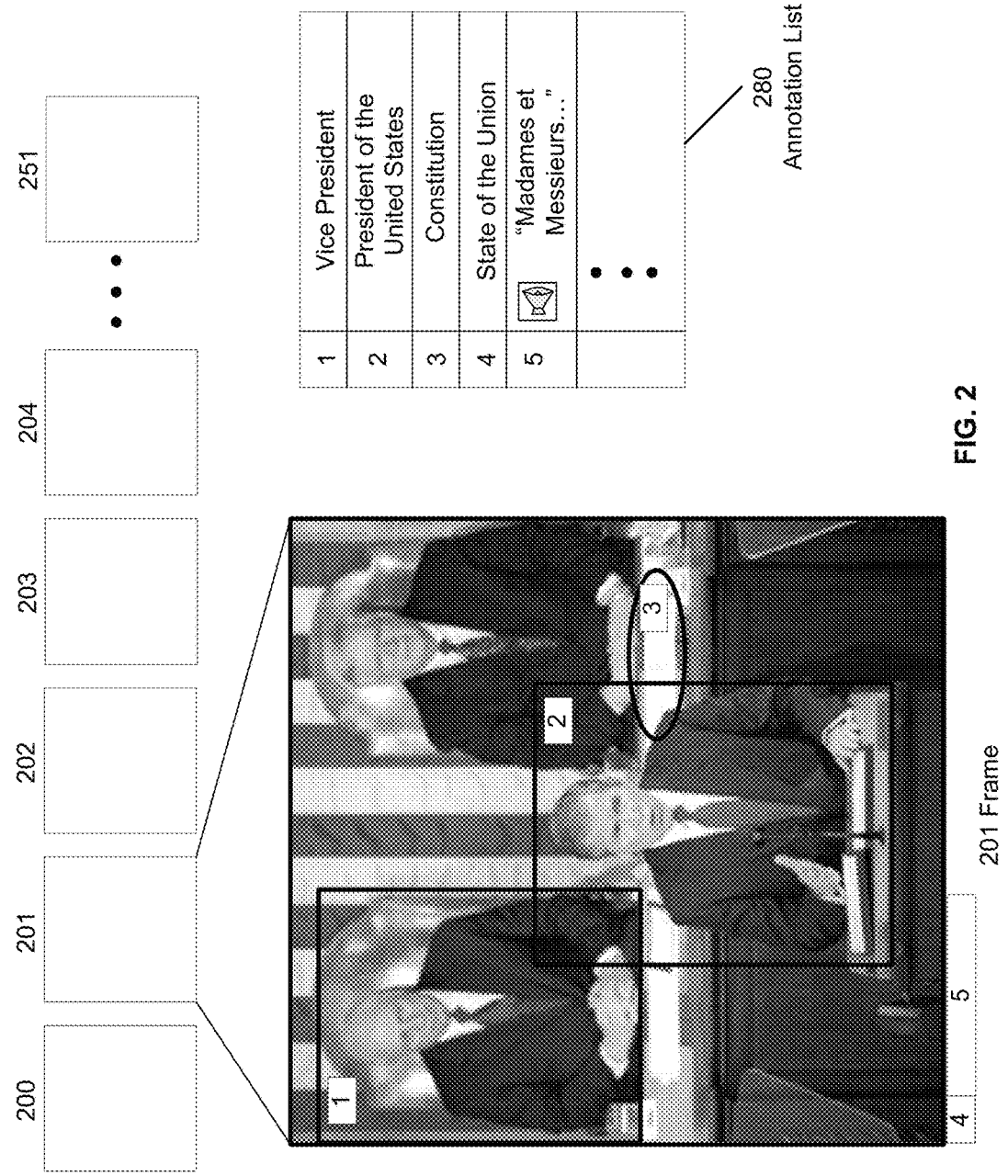
FIG. 2 illustrates frames of a video, and the indexing of annotations to one or more frames.

Referring now to FIG. 2, there is shown a conceptual diagram illustrating how annotations are associated temporally and/or spatially with a video file and one or more frames of thereof. FIG. 2 shows a series of video frames, running from frame 200 to frame 251. The client 104 displays these frames, and can also pause, rewind, fast-forward, skip, or otherwise adjust the order or speed with which the frames are displayed.

For the purposes of illustration, the following discussion refers to a video as being composed of frames. Video is sometimes stored or transmitted as blocks of frames, fields, macroblocks, or in sections of incomplete frames. When reference is made herein to video being composed of frames, it should be understood that during intermediate steps video may in fact be stored as any one of various other forms. The term "frame" is used herein for the sake of clarity, and is not limiting to any particular format or convention for the storage or display of video.

Some of the frames have annotations associated with them as provided by a particular user. In the example illustrated, frame 201 is drawn in greater to detail to illustrate some of its associated annotations. As shown in the figure, annotations can be associated with a particular spatial location of a frame, or they can be associated with an entire frame. For example, annotation 1 is associated with a rectangular box in the upper-left corner of frame 201. In contrast, annotation 4 is associated with the entire frame.

Annotations can also be associated with overlapping spatial locations. For example, annotation 1 is associated with a rectangular box overlapping a different rectangular box associated with annotation 2. In one embodiment, annotations can be associated with a spatial location defined by any closed form shape. For example, as shown in FIG. 2, annotation 3 is associated with spatial locations defined by an elliptical shape.

Annotation list 280 maintains associations between the spatial definition of annotations and the content of annotations Annotation 1, associated with a rectangular box in frame 201, includes the text "Vice President." Annotation 1 is an example of an annotation useful for highlighting or adding supplemental information to particular portions of a frame. Annotation 4 is associated with the entire frame 201 and contains the text "State of the Union." Annotation 4 is an example of an annotation used to summarize the content of a frame. Annotation 5 is associated with the entire frame 201 and contains some audio, which, in this case, is a French audio translation Annotation 5 is an example of an annotation used to provide supplemental audio content.

Annotations can also have temporal associations with a media file or any portion thereof. For example, an annotation can be associated with a specific frame, or a specific range of frames. In FIG. 2, for example, annotation 2 could be associated with frame 200 to frame 251, while annotation 5 is associated only with frame 201. The spatial definition associated with an annotation can also change over time. For example, annotation 1 can be associated with a first region in frame 201, and with a second region in frame 202. Time and spatially-dependent annotation associations are particularly useful for providing supplemental information regarding objects in motion, and can accommodate, as in the example shown in the figure, the movement of the Vice-President of the United States. The temporal associations can be defined in terms of frame numbers, timecodes, or any other indexing basis. The illustration of the annotation list 280 as a table is not meant to limit the underlying storage format used; any format or organization of the annotation information may be employed including optimized formats that reduce storage requirements and/or increase retrieval speed.

During playback of a media file, the client 104 is adapted to display the annotations associated with the frames of the file Annotations can be displayed, for example, as text superimposed on the video frame, as graphics shown alongside the frame, or as audio reproduced simultaneously with video; annotations may also appear in a separate window or frame proximate to the video. Annotations can also include commands for how the media file with which they are associated is to be displayed. Displaying command annotations can include displaying video as instructed by the annotation. For example, responsive to an annotation, the client 104 might skip to a different place in a video, display a portion of the video in slow motion, or jump to a different video altogether.

The client 104 is capable of displaying a subset of the available annotations. For example, a user watching the video of FIG. 2 can select which annotations should be displayed by the client 104 by designation of various criteria. The user can choose to receive only certain types of annotations (e.g. commentary, text, graphic, audio), or only annotations that are defined by a particular region of the display. The user can choose to receive only annotations in a particular language, matching a certain search criteria (such as keywords), or authored by a particular user. As another example, when annotations are written and edited in a collaborative community of users, a user can choose to receive only annotations authored by users with reputations above a certain threshold, or to receive only annotations with ratings above a certain threshold. Users can also search for annotations, and retrieve associated video based on the results of the annotation search.

Certain annotations can be given a priority that does not allow a user to prevent them from being displayed. For example, annotations can include advertisements, which may be configured so that no other annotations are displayed unless the advertisement annotations are also displayed. Such a configuration would prevent users from viewing certain annotations while avoiding paid advertisement annotations. A method for determining which annotations to display is described herein with reference to FIG. 8.

Users can also edit annotations using the client 104. For example, a user viewing the annotations shown in FIG. 2 may be dissatisfied with annotation 1. The user changes the annotation text "Vice President" to "Vice President of the United States" using an input device connected to the client 104. Future display of the annotation (to this user or possibly other users) would include the modified text "Vice President of the United States." As another option, a user can change the temporal or spatial definition with which annotations or associated. For example, the astute user may recognize that the documents shown on the right side of the frame are actually excerpts from 15 USC §§78dd-1, and that the Constitution (despite being almost completely obscured by the position of the President) is just barely visible on the left side of the frame. The user can change the temporal definition with which Annotation 3 is associated accordingly, for example, by dragging (for example, in a direct manipulation user interface illustrating frames of the video) the spatial definition to a different location using an input device connected to the client 104.

The annotation list 280 is shown in FIG. 2 for the purposes of illustration as one example of how a client can organize annotations and their associated frames. The annotation list 280 is useful for managing and displaying annotations associated with a frame or range of frames, but various clients can organize annotations differently without departing from the scope of the present invention.

Figure 3:
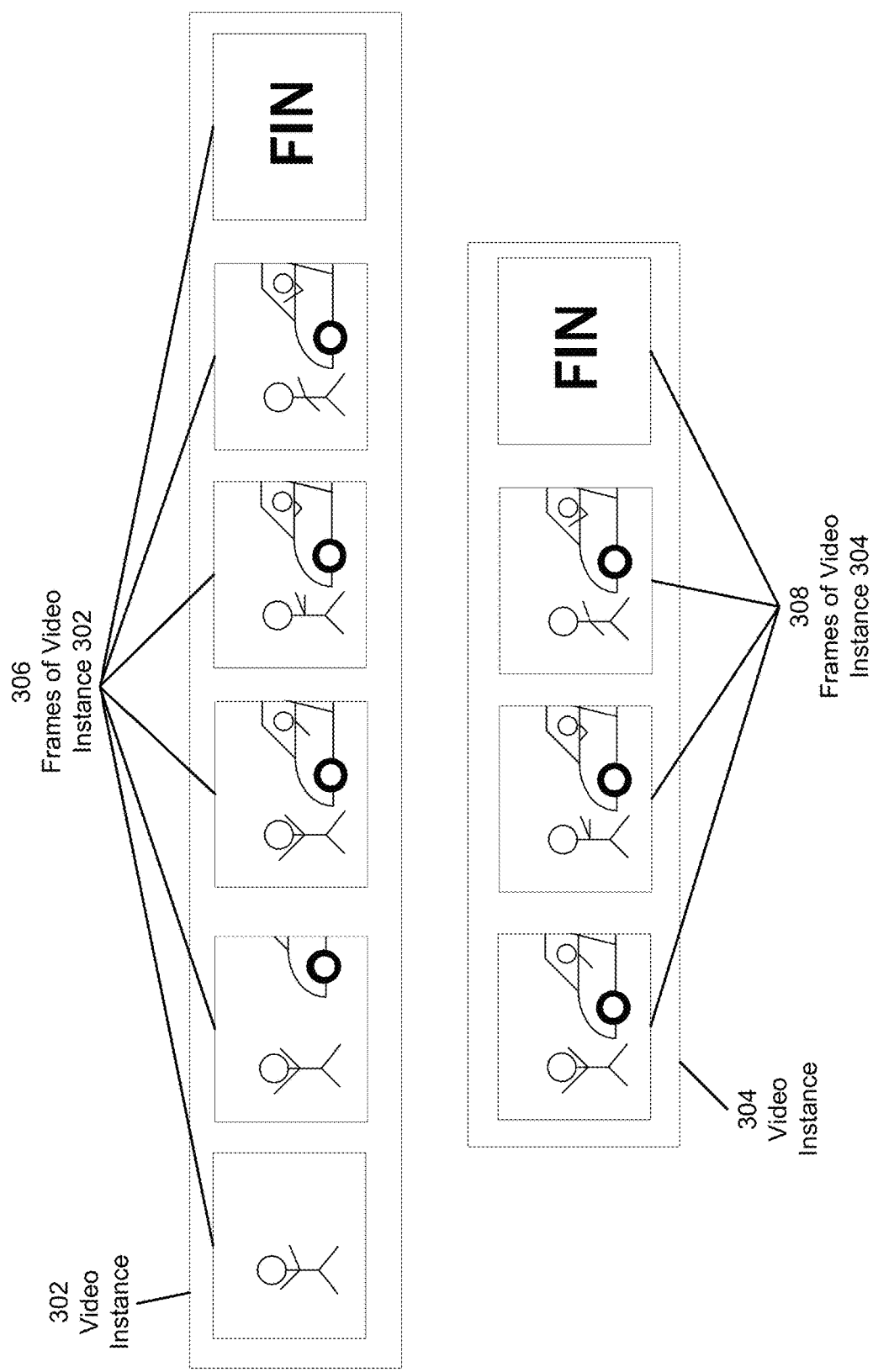
FIG. 3 illustrates frames of two instances of a video.

As shown in FIG. 1, a client sometimes has access to multiple instances of the same video, and different clients frequently have access to various different instances. FIG. 3 illustrates sequences of the frames making up two instances of the same video. For example, video instance 302 could be a copy of a video received from a cable channel, while video instance 304 is a copy of the same video received from an online video store. As another example, video instance 302 could be a copy of a video recorded by a first user's digital video recorder receiving a signal from a first broadcast station, while video instance 304 is a copy of the same video recorded by a second user's digital video recorder receiving a signal from a second broadcast station.

As video instance 302 is acquired independently of video instance 304, it is likely that the two copies are not time-synchronized, and/or are of different lengths. For example, video instance 302 might have been recorded from The Zurich Channel, a television affiliate known for its punctuality and good taste. Video instance 304, on the other hand, might have been recorded from TV Tulsa, a television affiliate known for its slipshod programming and haphazard timing. Thus, as shown in FIG. 3, the frames of the first instance might not necessarily correspond to the frames of the second instance. In addition, there are numerous other types of differences that can arise between different instances of a given program or broadcast. These include, and are not limited to, differences in encoding parameters (e.g., resolution, frame rate) and differences in file formats.

In the example illustrated, the frames 306 of video instance 302 are time-shifted with respect to the frames 308 of the video instance 304. The first frame of the frames 308 contains the same content as the third frame of the frames 306. When annotations are associated with specific frames of a video by one user, it is desirable that they be displayed with those frames when shown to another user in spite of the possibility of time shifting between various instances of the video. Notice as well that video instance 302 has 6 frames, whereas video instance 304 has 4 frames.

The annotation server 110 accounts for this time shifting of frames so that annotations can be properly displayed with various instances of the video. For example, suppose an annotation describes the driver who enters the third frame of the frames 306. If this annotation is indexed with respect to the frames 306, the annotation server 110 translates this index to an index with respect to the frames 308 so that the annotation can be properly displayed with the video instance 304. The annotation server 110 translates the annotation indexes by mapping one video instance to another.

Figure 4A:
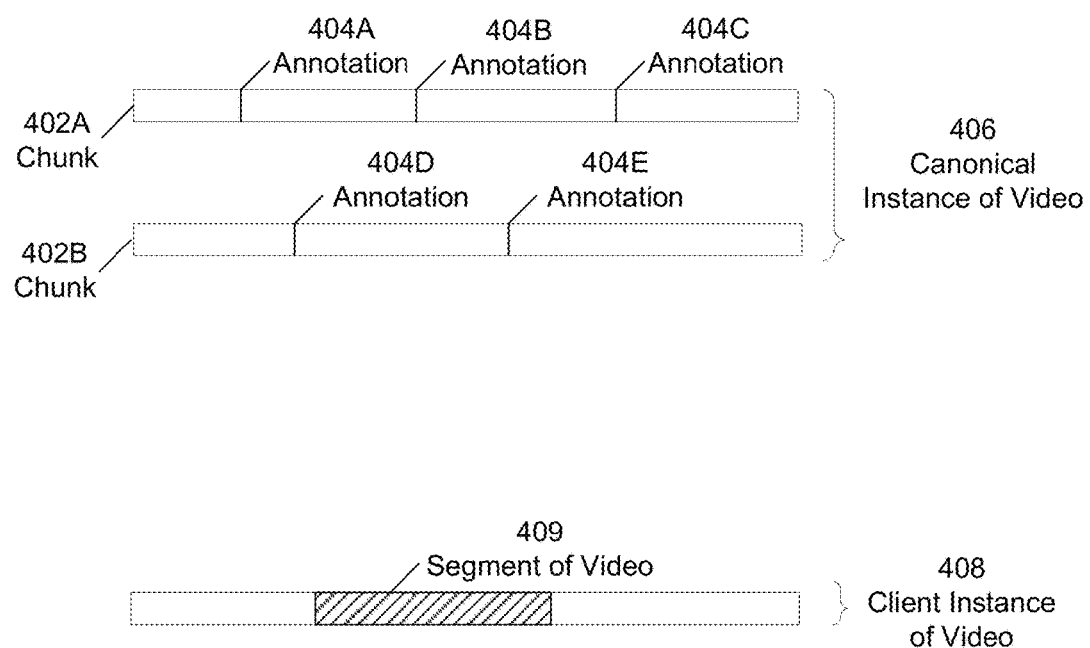
FIG. 4(a) illustrates annotations indexed to a canonical instance of video.

Referring now to FIG. 4(a), annotations 404 are indexed to a canonical instance of video 406. For the purposes of illustration, the instance of video having annotations indexed to it is referred to as the canonical instance, and the instance of video that will be displayed at the client is referred to as the client instance. According to one embodiment, annotations can be shared in multiple directions between two or more client peers. As such, it is possible that there is no definitively canonical instance of video. It should be understood that the term "canonical instance" refers to a role that an instance of video plays in one case of annotation exchange, and not necessarily to the status of that copy of the video in the video distribution system or in the annotation framework as a whole.

The video server 108 may store video content in chunks. One system and method for storing video in chunks is disclosed in U.S. patent application Ser. No. 11/428,319, titled "Dynamic Media Serving Infrastructure" to Manish Gupta, et al., filed Jun. 30, 2006, and U.S. Provisional Patent Application Ser. No. 60/756,787, titled "Discontinuous Download of Media Articles" to Michael Yu, et al., filed Jan. 6, 2006, both of which are incorporated herein by reference in their entirety. FIG. 4(a) shows a canonical instance of video 406 stored as chunk 402A and chunk 402B. A chunk is a data element for storing video. Storing video in chunks is beneficial for the efficient indexing and transfer of video, and allows for the manipulation as video data of more manageable size.

As described herein with reference to FIG. 2, an annotation can be associated with a specific frame in a video. The association between the annotation and the specific frame is stored by indexing the annotation to a frame in a particular instance of the video. Annotation 404A, for example, is indexed to a frame of the canonical instance of video 406, in this case to a frame in the chunk 402A.

As also described herein with reference to FIG. 2, an annotation can be associated with a range of frames in a video. A set of one or more frames of video is sometimes referred to as a segment of video Annotation 404D, for example, is indexed to a segment of video of the canonical instance of video 406, in this case the segment including one or more frames of the chunk 402B.

The client receives a video from a video source or server (such as one of those described herein with reference to FIG. 1) and stores a copy as the client instance of video 408. As the client displays the video, the client periodically requests, from the annotation server, annotations associated with frames of video about to be displayed. To ensure that annotations are requested, retrieved, transmitted and received in sufficient time for display with their associated frames, the client requests annotations associated with a frame some time before that frame is to be displayed.

For increased efficiency, the client can combine requests for annotations associated with particular frames into a request for annotations associated with a segment of video. A request could, for example, seek to retrieve all of the annotations associated with a given video. In the example shown, the client requests annotations associated with the segment of video 409. The request for annotations will return annotations associated with individual frames of the segment, or annotations associated with a superset or subset of the frames of the segment. For example, the client can request annotations associated with exactly the segment of video 409, associated with individual frames of the segment of video 409, or associated with the entire video.

Figure 4B:
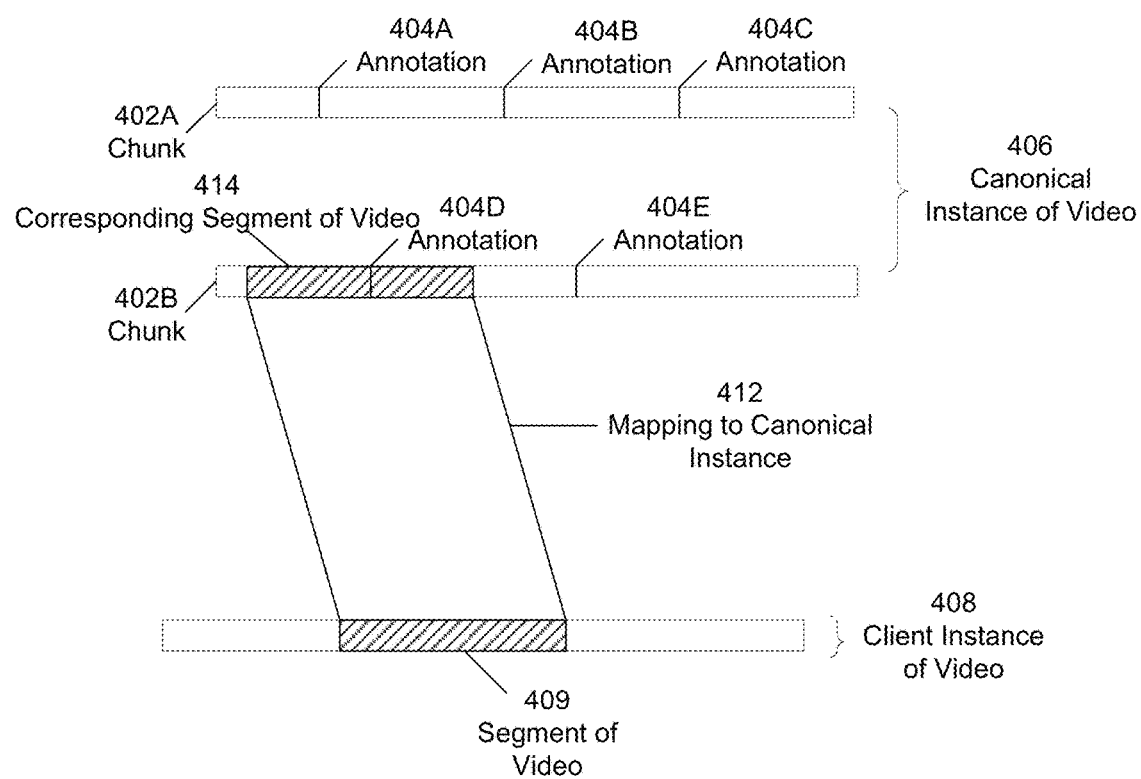
FIG. 4(b) illustrates mapping a client instance of video to a canonical instance of video.

Referring now to FIG. 4(b), the annotation server 110 maps the client instance of video 408 to a canonical instance of video 406. The mapping 412 describes the correspondence between frames of the client instance of video 408 and frames in the canonical instance of video 406. The annotation server 110 can map the client instance of the video 408 to the canonical instance of video 406 using a variety of techniques. According to one embodiment of the present invention, the client's request for annotations includes a feature of the client instance of video 408. A feature is a succinct representation of the content of one or more frames of video that are similar. For example, the annotation server 110 may group the frames into logical units, such as scenes or shots. The annotation server 110 may use scene detection algorithms to group the frames automatically. One scene detection algorithm is described in Naphade, M. R., et al., "A High-Performance Shot Boundary Detection Algorithm Using Multiple Cues", 1998 International Conference on Image Processing (Oct. 4-7, 1998), vol. 1, pp. 884-887, which is incorporated by reference herein.

Thus, the annotation server 110 can compute one feature set for all frames that belong to the same scene. The feature can be, for example, a description of a characteristic in the time, spatial, or frequency domains. For example, a client can request annotations associated with a specific frame, and can describe that frame by its time, position, and frequency domain characteristics. The client can use any technique for determining features of video, such as those described in Zabih, R., Miller, J., and Mai, K., "Feature-Based Algorithms for Detecting and Classifying Scene Breaks", Proc. ACM Multimedia 95, San Francisco, Calif. (November 1993), pp. 189-200; Arman, F., Hsu, A., and Chiu, M-Y., "Image Processing on Encoded Video Sequences", Multimedia Systems (1994), vol. 1, no. 5, pp. 211-219; Ford, R. M., et al., "Metrics for Shot Boundary Detection in Digital Video Sequences", Multimedia Systems (2000), vol. 8, pp. 37-46, all of the foregoing being incorporated by reference herein. One of ordinary skill in the art would recognize various techniques for determining features of video.

Generally, a distance function is defined over the universe of features that captures the closeness of the underlying sets of frames. When the annotation server 110 receives a request for annotation for a frame, along with its feature set, the server first attempts to map the frame in the request to the closest frame in the canonical instance of video 406. The annotation server 110 uses the temporal position of the frame in the client instance of video 408 (one of the features in the feature set) to narrow down the set of frames in the canonical video 406 that may potentially map to this frame, e.g., by limiting the candidate set to frames within a fixed amount of time or frames before and after the selected frame. For all of the frames in the candidate set, the annotation server 110 computes the distance between the feature set of the frame from the client 408 and feature set of the frame from canonical video 406. The frame from the canonical video 406 with the shortest distance is termed as the matching frame. The client frame is then mapped to the matching frame. If the distance to the closest frame is greater than a certain threshold, indicating absence of a good match, no annotations are returned. The components described by a feature used to create the mapping can reside in the segment of video for which annotations are being requested, but need not be. Similarly, the components described by a feature may or may not reside in the segment of video to which an annotation is indexed.

Features may be represented as strings, allowing the annotation server 110 to search for features using an inverted index from feature strings to frames, for example. The annotation server 110 may also search for features by defining a distance metric over the feature set and selecting the candidate frame with the smallest distance. Such mapping could take place at the time the server 110 receives the client request, or the annotation server 110 can pre-compute and maintain the distances in an offline process.

Using the mapping 412, the annotation server 110 determines a corresponding segment of video 414 in the canonical instance of video. The corresponding segment of video 414 has content that closely matches the content of the segment of video 409, as described above. Under ideal conditions, the corresponding segment of video 414 contains instances of the same frames as the segment of video 409. The annotation server 110 associates each frame in the client video 408 that maps to a frame in the canonical instance of video with a frame number and maintains a list of frame numbers for each frame mapping. In one example, the length of the list of frame numbers is equal to the number of frames in the client instance of video 408, where each entry maps the corresponding frame to the frame in the canonical instance of video 406.

The annotation server determines the annotations that are indexed to the corresponding segment of video 414 (or to a superset or subset of the corresponding segment of video 414). As the example of FIG. 4(*b*) illustrates, the annotation 404D is indexed to a segment of video that falls in the corresponding segment of video 414. In response to the request for annotations for the segment 409, the annotation server 110 transmits the annotation 404D to the client.

Optionally, the annotation server can also transmit information describing the segment of the video that the annotation is associated with. For example, using a feature as a reference point, the annotation server can describe a frame (or range of frames) with respect to that reference point.

Figure 5:
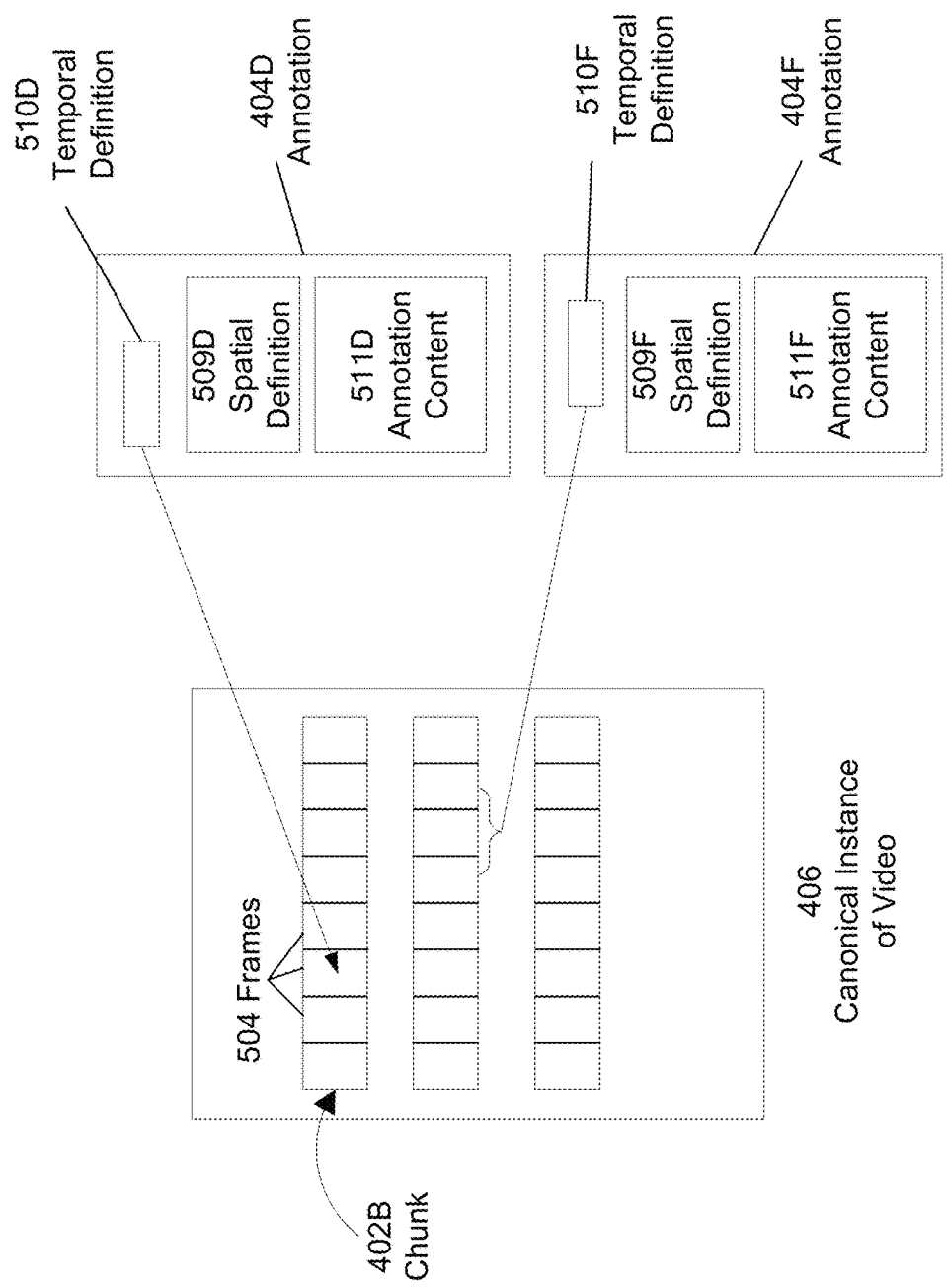
FIG. 5 illustrates one embodiment for storing video and annotations.

FIG. 5 illustrates the organization of video and annotations. FIG. 5 shows how annotations can be indexed to a canonical instance of video in an annotation server.

According to one embodiment, annotations are stored in an annotation repository. Canonical instances of video are stored in a video repository. The annotation and repositories can be included in the same server, or they can be included in different servers. For example, the annotations can be stored in the annotation server 110 and video can be stored in the video server 108.

An annotation includes a reference to a segment of video. For example, the annotation 404D includes a temporal definition 501D. A temporal definition specifies one or more frames of a canonical instance of video. In the example illustrated, the temporal definition 501D refers to one of the frames 504 of the canonical instance of video 406. As another example, the annotation 404F includes temporal definition 510F. Temporal definition 510F refers to a range of the frames of the canonical instance of video 406. A temporal definition can described using a variety of metrics including, but not limited to, document identifiers, frame identifiers, timecodes, length in frames, length in milliseconds, and various other combinations.

The temporal definition is one example of how annotations can be associated with segments of video. Other methods for associating annotations with segments of video will be apparent to one of skill in the art without departing from the scope of the present invention.

An annotation also includes annotation content 511. Annotation content can include, for example, audio, text, metadata, commands, or any other data useful to be associated with a media file. An annotation can optionally include a spatial definition 509, which specifies the area of the frame (or frames) with which that annotation is associated. Use of a spatial definition 509 is an example of one method for associating an annotation with a specific spatial location on a frame.

As an example, suppose the corresponding segment of video 414 includes the frames 504. The corresponding segment of video 414 can be defined as a range of timecodes. The annotation server retrieves annotations by searching for annotations with references to timecodes that are within or overlapping with the range of timecodes defining the corresponding segment of video 414. The annotation server retrieves annotation 404D, including the annotation content 511D. The annotation server transmits the annotation content 511D (or the annotation 404D, which includes the annotation content 511D) to the client, which displays the annotation content 511D.

Figure 6:
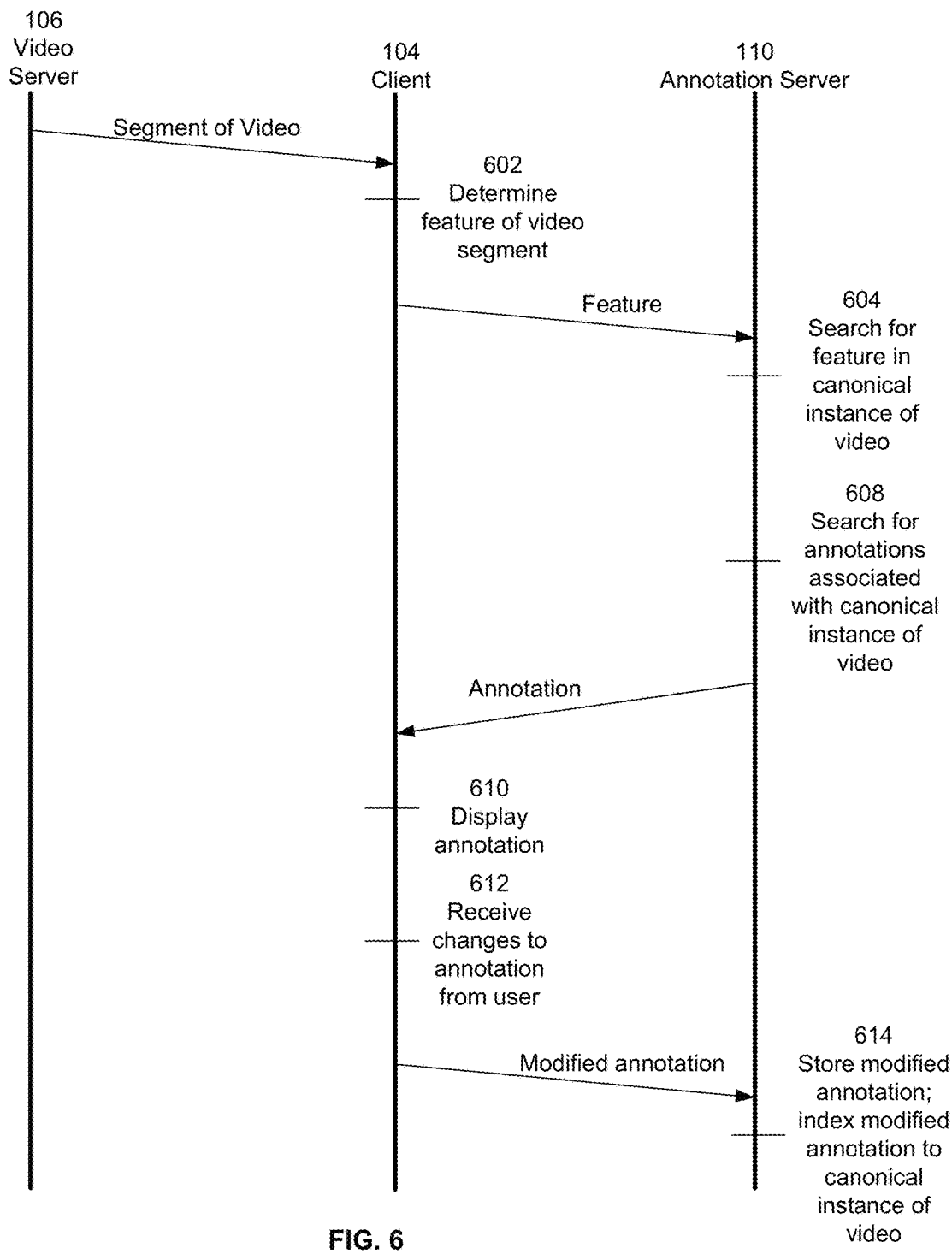
FIG. 6 is an event trace of the display and modification of annotations associated with a video.

FIG. 6 is an event trace of the display and modification of annotations associated with a video, according to one embodiment of the present invention. The client 104 receives a segment of video from a video server 106 or a video source 102, and stores a copy as the client instance of video. The client processes the segment using a feature detection algorithm and determines 602 a feature based on a first segment of video. The client sends a request for annotations associated with a second segment of video, the request including the feature, to the annotation server 110.

The first segment of video may contain some frames in common with the second segment of video, but need not. The feature included in the request for annotations associated with the second segment of video may additionally include features from adjacent segments to the second segment of video.

The request can also include metadata describing the content or title of the video so that the annotation server can retrieve the appropriate annotations. For example, video purchased from an online store may have a video title that can be used to filter the set of available annotations. As another example, the metadata sent to the annotation server for video acquired from broadcast television or cable can include a description of the time and channel at which the video was acquired. The annotation server can use this time and channel information to determine the appropriate video and retrieve annotations associated with that video.

The annotation server 110 receives the request for annotations. The annotation server 110 searches 604 for the feature included in the request in a canonical instance of the video and creates a mapping between the client instance of the video and the canonical instance of the video. In one embodiment, the request for annotations includes metadata indicating a particular video for which to retrieve annotations, and the annotation server 110 searches 604 in a canonical instance in the video indicated by this metadata for the feature.

The annotation server 110 searches 608 an annotation repository for annotations associated with the video and returns an annotation. For example, the annotation server 110 can search for annotations indexed to the canonical instance of the video. Using the mapping between the two instances, the annotation server 110 can translate the index to the canonical instance of the video to an index to the client instance of the video The annotation server 110 transmits an annotation associated with the video to the client. According to one embodiment, the annotation also includes index information defining the set of one or more frames associated with the annotation. The annotation server 110 can define frames associated with the annotation, for example, by indexing the association with respect to the feature.

The client 104 receives and displays 610 the annotation. The client 104 can also process index information for the annotation so that the annotation is displayed appropriately along with the client instance of the video.

Optionally, the client receives 612 changes to the annotation from the user. For example, a user can edit text, re-record audio, modify metadata included in the annotation content, or change an annotation command. The client 104 transmits the modified annotation to the annotation server 110, or, alternatively, transmits a description of the modifications the annotation server 110.

The annotation server 110 receives the modified annotation. The annotation server 110 stores 614 the modified annotation and indexes the modified annotation to the canonical instance of the video. The annotation server 110 can index the modified annotation with the canonical instance of the video using a variety of methods. For example, the annotation server 110 can translate an index to the client instance of the video using a previously established mapping. As another example, the client 104 can include a feature with the modified annotation, and the annotation server 110 can establish a new mapping between the client instance of the video and the canonical instance of the video.

For the purposes of illustration, features have been shown as flowing from the client 104 to the annotation server 110. However, for the purpose of establishing a mapping between the client instance of the video and the canonical instance of the video, features can flow in either direction. The example of the annotation server 110 maintaining this mapping on the basis of features sent by the client 104 is given for the purposes of illustration and is not limiting. In another embodiment, the client maintains the mapping between the client instance of the video and the canonical instance of the video, for example, on the basis of features of the canonical instance of the video sent by the annotation server 110 to the client 104. In yet another embodiment, a third party maintains the mapping between the client instance of the video and the canonical instance of the video by receiving features from both the annotation server 110 and the client 104.

The client 104 can also be used to submit a new annotation. For example, a user can create annotation content and associate it with a video. The user can also specify a spatial definition for the new annotation and choose a range of frames of the client instance of the video to which the annotation will be indexed. The client 104 transmits the new annotation to the annotation server 110 for storage.

Referring now to FIG. 7(*a*), a user can search, create, or edit annotations using a graphical user interface. In the example illustrated, the graphical user interface for annotations is integrated into a video player graphical user interface 702. The video player graphical user interface 702 is an example of an interface that might be shown on the display device of a client 104. The video player graphical user interface 702 includes a display area for presenting the media file (in the example illustrated, a video), as well as control buttons for selecting, playing, pausing, fast forwarding, and rewinding the media file. The video player graphical user interface 702 can also include advertisements, such as the advertisement for the National Archives and Records Administration shown in FIG. 7(*a*).

The video player graphical user interface 702 presents a frame of video. Shown along with the frame of video is an annotation definition 704. The annotation definition 704 graphically illustrates the spatial definition and/or the temporal definition of an annotation. For example, the annotation definition 704 shown in FIG. 7(*a*) delineates a subset of the frame with which an annotation is associated. As another example, an annotation definition 704 can delineate a range of frames with which an annotation is associated. While a single annotation definition 704 is shown in FIG. 7(*a*), the video player graphical user interface 702 can include a plurality of annotation definitions 704 without departing from the scope of the invention.

The annotation definition 704 can be displayed in response to a user selection, or as part of the display of an existing annotation. For example, the user can use an input device to select a region of the frame with which a new annotation will be associated, and in response to that selection the video player graphical user interface 702 displays the annotation definition 704 created by the user. As another example, the video player graphical user interface 702 can display video and associated annotations, and can display the annotation definition 704 in conjunction with displaying an associated annotation.

The video player graphical user interface 702 also includes annotation control buttons 706, which allow the user to control the content and display of annotations. For example, the video player graphical user interface 702 can include a button for searching annotations. In response to the selection of the search annotations button, the client searches for annotations associated with the annotation definition 704 (or a similar definition), or for annotations associated with a keyword. The results of the search can then be displayed on the video player graphical user interface 702. As another example, the video player graphical user interface 702 can include a button for editing annotations. In response to the selection of the edit annotations button, the video player graphical user interface 702 displays one or more annotations associated with the annotation definition 704 and allows the user to modify the one or more annotations. As yet another example, the video player graphical user interface 702 can include a button for creating a new annotation. In response to the selection of the create new annotation button, the video player graphical user interface 702 displays options such as those shown in FIG. 7(*b*).

Figure 7B:
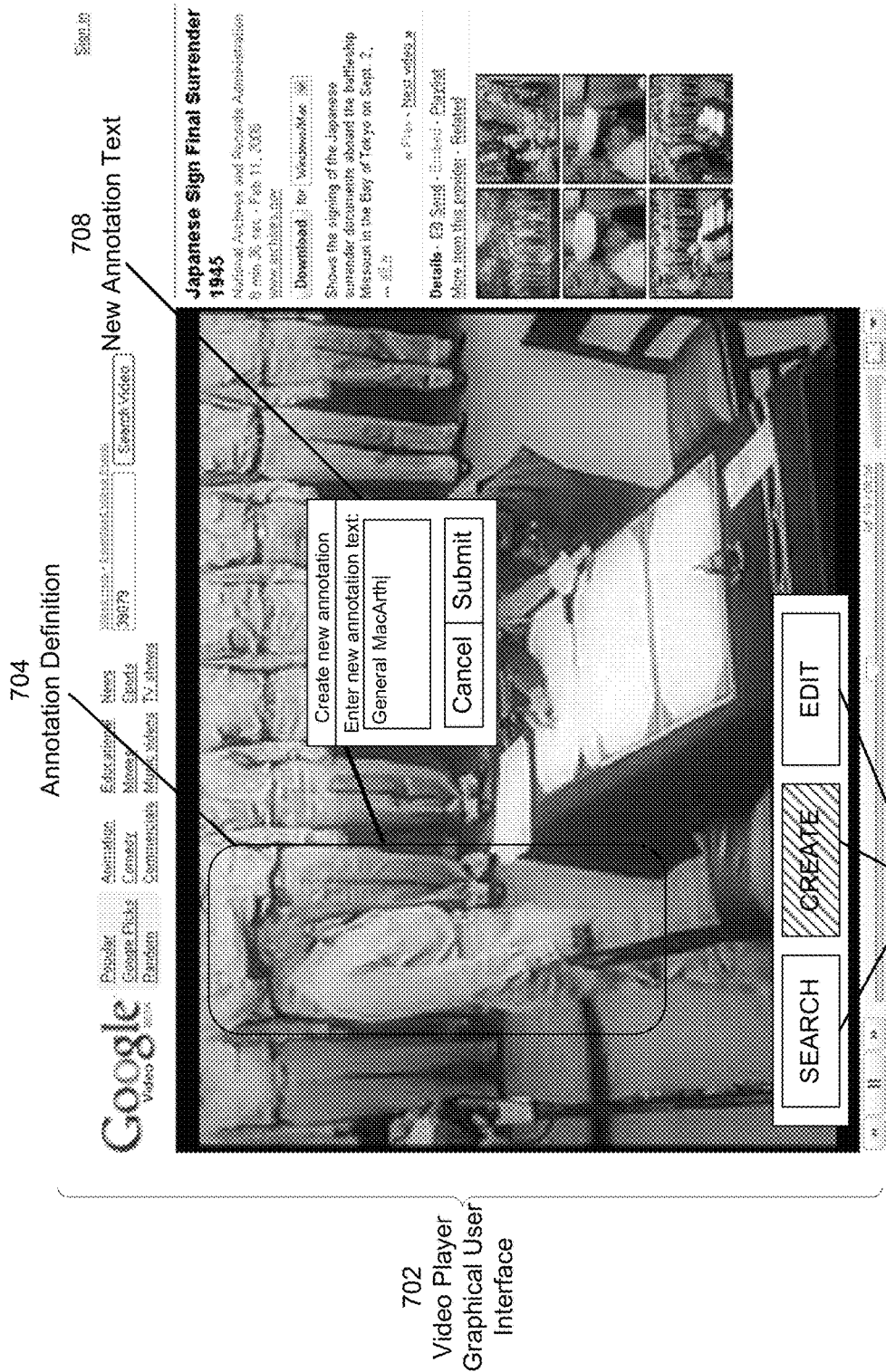
FIG. 7(b) illustrates a user interface for creating a new annotation.

Referring now to FIG. 7(b), the annotation control buttons 706 indicate that the create new annotation button has been selected. The video player graphical user interface 702 includes a display area for receiving user input of the new annotation content. In the example illustrated, the new annotation content includes some new annotation text 708. As shown in FIG. 7(b), as the user enters the description "General MacArthur", the new annotation text 708 is displayed. In response to a further user selection indicating the authoring of annotation content is complete, the new annotation is submitted, for example, to the annotation server 110, and displayed in the video player graphical user interface 702.

The entering of new annotation text 708 has been shown as an example of the authoring of annotation content. The video player graphical user interface 702 can be adapted to receive other types of annotation content as well. For example, annotation content can include audio, and the video player graphical user interface 702 can include a button for starting recording of audio through a microphone, or for selecting an audio file from a location on a storage medium. Other types of annotations and similar methods for receiving their submission by a user will be apparent to one of skill in the art without departing from the scope of the invention.

Figure 8:
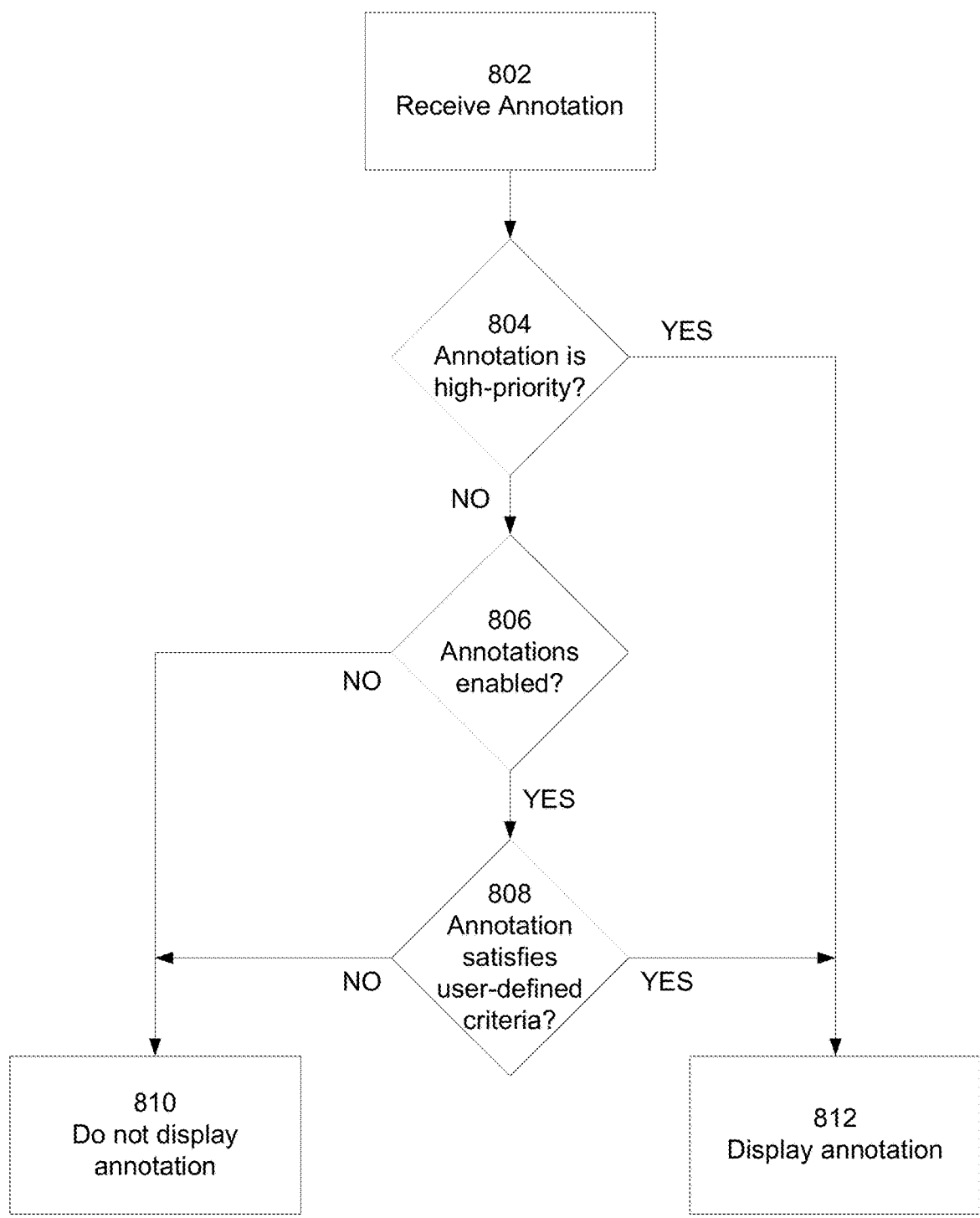
FIG. 8 illustrates a method for determining which annotations to display.

FIG. 8 illustrates a method for determining which annotations to display. In one embodiment, the client 104 displays only some of the received annotations. The client 104 performs a method such as the one illustrated in FIG. 8 to determine which annotations should be displayed and which should not.

The client 104 receives 802 an annotation. The client determines 804 if the annotation is high-priority. A high-priority annotation is displayed regardless of user settings for the display of annotations. High-priority annotations can include, for example, advertisements, emergency broadcast messages, or other communications whose importance that should supersede local user settings.

If the client 104 determines 804 that the annotation is high-priority, the client displays 812 the annotation. If the client 104 determines 804 that the annotation is not high-priority, the client determines 806 if annotations are enabled Annotations can be enabled or disabled, for example, by a user selection of an annotation display mode. If the user has selected to disable annotations, the client 104 does not display 810 the annotation. If the user has selected to enable annotations, the client 104 determines 808 if the annotation matches user-defined criteria.

As described herein, the client 104 allows the user to select annotations for display based on various criteria. In one embodiment, the user-defined criteria can be described in the request for annotation, limiting the annotations sent by the annotation server 110. In another embodiment, the user-defined criteria can be used to limit which annotations to display once annotations have been received at the client 104. User defined-criteria can specify which annotations to display, for example, on the basis of language, annotation content, particular authors or groups of authors, or other annotation properties.

If the client 104 determines 808 that the annotation satisfies the user-defined criteria, the client 104 displays 812 the annotation. If the client 104 determines 808 that the annotation does not satisfy the user-defined criteria, the client 104 does not display 810 the annotation.

FIG. 8 illustrates one example of how the client 104 may determine which annotations to display. Other methods for arbitrating annotation priorities established by the annotation provider and the annotation consumer will be apparent to one of skill in the art without departing from the scope of the present invention.

Turning now to the canonical instance of video disclosed herein, the canonical instance of video can be implemented in a variety of ways according to various embodiments. In some cases, the annotation server 110 has selected a canonical instance of the video prior to the submission of the new annotation. The client 104 can send a feature to facilitate the indexing of the new annotation to the canonical instance of the video. In other cases, for example, when the annotation is the first to be associated with a particular video, the annotation server 110 may not have yet identified a canonical instance of the video. The annotation server 110 stores the annotation indexed to the client instance of the video, and establishes the client instance of the video as the canonical instance of the video for future annotation transactions.

According to one embodiment of the present invention, annotations are stored indexed to features of the instance of video used by the client that submitted that annotation. Annotations can be stored and retrieved without any underlying canonical instance of video. For example, each annotation can be indexed to its own "canonical instance of video", which refers to the instance of video of the submitter. Such an approach is particularly beneficial for situations in which the annotation server 110 does not maintain or have access to copies of the video itself. Essentially, the annotation server 110 can serve as a blind broker of annotations, passing annotations from authors to consumers without its own copy of the video with which those annotations are associated.

A content-blind annotation server can be beneficial, for example, when the video content is copyrighted, private, or otherwise confidential. For example, a proud mother may want to annotate a film of her son's first bath, but might be reticent to submit even a reference instance of the video to a central annotation server. The content-blind annotation server stores annotations indexed to the mother's instance of the video, without access to an instance of its own. When an aunt, uncle, or other trusted user with a instance of the video requests annotations, his instance is mapped to the mother's instance by comparison of features of his instance to features of the mother's instance received with the submission of the annotation. Features can be determined in such a way that cannot be easily reversed to find the content of a frame, thus preserving the privacy of the video.

The case of an annotation server and a client is but one example in which the present invention may be usefully employed for the sharing and distribution of annotations for video. It will be apparent to one of skill in the art that the methods described herein for transmitting annotations without the need to transmit associated video will have a variety of other uses without departing from the scope of the present invention. For example, the features described herein could be used in an online community in which users can author, edit, review, publish, and view annotations collaboratively, without the burdens of transferring or hosting video directly. Such a community would allow for open-source style production of annotations without infringing the copyright protections of the video with which those annotations are associated.

As an added feature, a user in such a community could also accumulate a reputation, for example based on other users' review of the quality of that user's previous authoring or editing. A user who wants to view annotations could have the option of ignoring annotations from users with reputations below a certain threshold, or to search for annotations by users with reputations of an exceedingly high caliber. As another example, a user could select to view annotations only from a specific user, or from a specific group of users.

As described herein, annotations can also include commands describing how video should be displayed, for example, commands that instruct a display device to skip forward in that video, or to jump to another video entirely. A user could author a string of jump-to command annotations, effectively providing a suggestion for the combination of video segments into a larger piece. As an example, command annotations can be used to create a new movie from component parts of one or more other movies. The annotation server provides the annotations to the client, which acquires the various segments specified by the annotations and assembles the pieces for display to the user.

The present invention has applicability to any of a variety of hosting models, including but not limited to peer-to-peer, distributed hosting, wiki-style hosting, centralized serving, or other known methods for sharing data over a network.

The annotation framework described herein presents the opportunity for a plurality of revenue models. As an example, the owner of the annotation server can charge of fee for including advertisements in annotations. The annotation server can target advertisement annotations to the user based on a variety of factors. For example, the annotation server could select advertisements for transmission to the client based on the title or category of the video that the client is displaying, known facts about the user, recent annotation search requests (such as keyword searches), other annotations previously submitted for the video, the geographic location of the client, or other criteria useful for effectively targeting advertising.

Access to annotations could be provided on a subscription basis, or annotations could be sold in a package with the video content itself. For example, a user who purchases a video from an online video store might be given permission for viewing, editing, or authoring annotations, either associated with that video or with other videos. An online video store might have a promotion, for example, in which the purchase of a certain number of videos in a month gives the user privileges on an annotation server for that month.

Alternatively, the purchase of a video from an online video store might be coupled to privileges to author, edit, or view annotations associated with that video. If a particular annotation server becomes particularly popular with users, controlled access to the annotation server could assist with the protection of the copyrights of the video. For example, a user might have to prove that he has a certified legitimately acquired copy of a video before being allowed to view, edit, or author annotations. Such a requirement could reduce the usefulness or desirability of illegally acquired copies of video.

These examples of revenue models have been given for the purposes of illustration and are not limiting. Other applications and potentially profitable uses will be apparent to one of skill in the art without departing from the scope of the present invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for providing annotations at a client device in conjunction with a video, the method comprising:
   presenting the video at the client device, presenting the video including presenting a frame on a display;
   during the presenting of the frame, visually distinguishing a subset of the frame on the display with an annotation definition, the subset being less than all of the frame;
   determining whether the annotation definition of the subset of the frame being presented on the display is associated with an annotation having properties that match user-defined criteria describing one or more annotation properties; and
   in response to the determination, presenting the annotation corresponding to the annotation definition of the subset of the frame contemporaneously with the presentation of the frame.

2. The method of claim 1, wherein distinguishing the subset of the frame comprises displaying a visual border around the subset of the frame.

3. The method of claim 1, wherein the subset of the frame depicts an entity, the method further comprising:
  distinguishing a second subset of a second frame of the video, the second subset depicting the entity; and
  providing the annotation in conjunction with the second frame.

4. The method of claim 1, wherein the method further comprises:
  obtaining an indication of the subset of the frame, the obtaining including a user selecting a corresponding portion of the visual representation; and
  editing the annotation in response to user input.

5. The method of claim 1, further comprising:
  distinguishing a second subset of frame during the presenting; and
  providing a second annotation corresponding to the second subset of the frame in conjunction with the frame.

6. The method of claim 1, wherein the annotation includes audio content.

7. The method of claim 1, further comprising presenting a list of annotations that correspond to the frame in conjunction with the frame.

8. A computer system for adding an annotation to a video, the system comprising:
  a computer processor; and
  a computer-readable storage medium storing computer program instructions, the computer program instructions to configure the processor to perform operations comprising:
    presenting the video to a user, presenting the video including presenting a frame on a display;
    during the presenting of the frame, obtaining, from user input, an indication of a subset of a frame of the video, the subset being less than all of the frame; and
    presenting a user interface configured to enable the user to provide annotation content to be associated with the subset of the frame, the annotation configured for contemporaneous display with frame along with a visual indication distinguishing the subset of the frame.

9. The computer system of claim 8, wherein presenting the video to the user comprises displaying a visual representation of the video to the user, and obtaining the indication of the subset of the frame comprises the user selecting a corresponding portion of the visual representation.

10. The computer system of claim 8, wherein the operations further comprise:
  distinguishing the subset of the frame during presentation of the video to indicate that the annotation is associated with the subset of the frame; and
  providing the annotation in conjunction with the frame.

11. The computer system of claim 10, wherein distinguishing the subset of the frame comprises displaying a visual border around the subset of the frame.

12. The computer system of claim 8, wherein the subset of the frame depicts an entity, the operations further comprising:
  distinguishing a second subset of a second frame of the video, the second subset depicting the entity; and
  providing the annotation in conjunction with the second frame.

13. The computer system of claim 8, wherein the operations the processor is configured to perform by the computer program instructions further comprise:
  distinguishing a second subset of the frame during the presenting; and
  providing a second annotation corresponding to the second subset of the frame in conjunction with the frame.

14. The computer system of claim 8, wherein the operations further comprise presenting a list of annotations that correspond to the frame in conjunction with the frame.

15. A computer program product, comprising a computer-readable storage medium storing computer program instructions for adding an annotation to a video, the computer program instructions to configure a computer processor to perform operations comprising:
  presenting the video to a user, presenting the video including presenting a frame on a display;
  during the presenting of the frame, obtaining, from user input, an indication of a subset of a frame of the video, the subset being less than all of the frame; and
  presenting a user interface configured to enable the user to provide annotation content to be associated with the subset of the frame, the annotation configured for contemporaneous display with frame along with a visual indication distinguishing the subset of the frame.

16. The computer program product of claim 15, wherein presenting the video to the user comprises displaying a visual representation of the video to the user, and obtaining the indication of the subset of the frame comprises the user selecting a corresponding portion of the visual representation.

17. The computer program product of claim 15, wherein the operations further comprise:
  distinguishing the subset of the frame during presentation of the video to indicate that the annotation is associated with the subset of the frame; and
  providing the annotation in conjunction with the frame.

18. The computer program product of claim 17, wherein distinguishing the subset of the frame comprises displaying a visual border around the subset of the frame.

19. The computer program product of claim 15, wherein the subset of the frame depicts an entity, the operations further comprising:
  distinguishing a second subset of a second frame of the video, the second subset depicting the entity; and
  providing the annotation in conjunction with the second frame.

20. The computer program product of claim 15, wherein the operations further comprise presenting a list of annotations that correspond to the frame in conjunction with the frame.

* * * * *